United States Patent
Bouazizi (10) Patent No.: US 8,363,585 B2
(45) Date of Patent: Jan. 29, 2013

(54) SYSTEM AND METHOD FOR SIGNALING AVAILABILITY OF AN MBMS USER SERVICE IN MULTIPLE VARIANTS

(75) Inventor: Imed Bouazizi, Tampere (FI)

(73) Assignee: Nokia Corporation

( * ) Notice: Subject to any disclaimer, the term of this patent is extended or adjusted under 35 U.S.C. 154(b) by 781 days.

(21) Appl. No.: 12/255,602

(22) Filed: Oct. 21, 2008

(65) Prior Publication Data

US 2009/0122740 A1 May 14, 2009

Related U.S. Application Data

(60) Provisional application No. 60/981,805, filed on Oct. 22, 2007.

(51) Int. Cl.
*H04H 20/71* (2008.01)
(52) U.S. Cl. .......................... 370/312; 370/328; 370/432
(58) Field of Classification Search .......................... None
See application file for complete search history.

(56) References Cited

U.S. PATENT DOCUMENTS

| | | | | |
|---|---|---|---|---|
| 7,852,795 | B2 * | 12/2010 | Cai .............................. | 370/312 |
| 2005/0090278 | A1 * | 4/2005 | Jeong et al. .................... | 455/525 |
| 2006/0189272 | A1 * | 8/2006 | Willenegger et al. ......... | 455/3.01 |
| 2008/0025240 | A1 * | 1/2008 | Casaccia et al. .............. | 370/312 |
| 2008/0045224 | A1 * | 2/2008 | Lu et al. ........................ | 455/446 |
| 2008/0232396 | A1 * | 9/2008 | Buckley et al. ............... | 370/465 |
| 2008/0268854 | A1 * | 10/2008 | Cai et al. ....................... | 455/444 |

OTHER PUBLICATIONS

Office Action for Russian Patent Application No. 2010120034/07(028486), dated Sep. 29, 2011.
English translation of Office Action for Russian Patent Application No. 2010120034/07(028486), dated Sep. 29, 2011.
"Reply LS to 'Physical layer enhancements for MBMS' (S4-070511/R2-073617 SA4 to RAN2)", Aug. 27, 2007, retrieved from the Internet: <URL: http://www.3gpp.org/ftp/tsg_ran/WG2_RL2/Outgoing_Liaisons/TSGR2_59/R2-073638.zip>.
Non-Final Rejection for Korean Patent Application No. 10-2010-7010927, dated Nov. 24, 2011.
3GPP TS 25.346 V6.0.0 (Mar. 2004); Technical Specification; 3$^{rd}$ Generation Partnership Project; Technical Specification Group Radio Access Network; Introduction of the Multimedia Broadcast Multicast Service (MBMS) in the Radio Access Network (RAN); Stage 2; (Release 6), Mar. 2004.
3GPP TS 26.346 V7.0.0 (Jun. 2006); Technical Specification; 3$^{rd}$ Generation Partnership Project; Technical Specification Group Services and System Aspects; Multimedia Broadcast/Multicast Service (MBMS); Protocols and codecs (Release 7), Jun. 2006.
RAN2, "Reply LS to "Physical Layer Enhancements for MBMS" (S4-070511/R2-073617 SA4 to RAN2)", 3GPP Draft; Mobile Competence Centre; France, p. 1, Aug. 24, 2007.
Orange et al. "LTE MBMS mobility scenarios needing service continuity" 3GPP; Mobile Competence Centre, France, pp. 1-5, Aug. 24, 2007.

(Continued)

*Primary Examiner* — Bob Phunkulh
(74) *Attorney, Agent, or Firm* — Alston & Bird LLP (57) ABSTRACT

A system and method for signaling the availability of a Multimedia Broadcast/Multicast Service (MBMS) user service in multiple variants. Various embodiments involve the usage of the additional capacity introduced by MBMS Over a Single Frequency Network (MBSFN) in order to carry a higher quality or more robust variant of the service in MBMS. The broadcast multicast service center (BM-SC) provides the same MBMS user service in two variants, one for the regular MBMS and the other for MBSFN. The MBSFN variant of the service may be charged differently and would then need to be protected separately. In various embodiments, the user equipment is informed that the same service is present in different variants and therefore can then select one of the available variants for consumption.

24 Claims, 7 Drawing Sheets

OTHER PUBLICATIONS

Orange, "Text Proposal for MBMS Service Continuity when moving between SFN and non-SFN zones" Mobile Competence Centre, France, pp. 1-4, Aug. 9, 2008.
International Search Report for PCT Application No. PCT/IB2008/054291 mailed Mar. 31, 2009.
Office Action for Mexican Application No. MX/a/2010/004411 dated May 16, 2012.
Office Action for Chinese Application No. 200880119307.6 dated Oct. 31, 2012.

* cited by examiner

SYSTEM AND METHOD FOR SIGNALING AVAILABILITY OF AN MBMS USER SERVICE IN MULTIPLE VARIANTS

CROSS-REFERENCE TO RELATED PATENT APPLICATIONS

This application claims priority from Provisional Application U.S. Application 60/981,805, filed Oct. 22, 2007, incorporated herein by reference in its entirety.

FIELD OF THE INVENTION

The present invention relates generally to Multimedia Broadcast/Multicast Services (MBMS). More particularly, the present invention relates to the signaling and processing of information in an MBMS environment.

BACKGROUND OF THE INVENTION

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The 3$^{rd}$ Generation Partnership Project (3GPP) has defined MBMS for the simultaneous delivery of multimedia content to a large set of receivers. A set of MBMS specifications have been published by 3GPP, covering all aspects of the service from the radio access to the content delivery applications and protocols.

MBMS can be split into three general areas—bearer services, delivery methods, and user services and applications. A MBMS bearer service provides a bit pipe for the transport of IP traffic to a group of receivers in an efficient manner. Two delivery methods have been defined in MBMS—streaming and file downloading. The streaming delivery method defines the protocols for the delivery of multimedia content for immediate consumption (e.g., a Mobile TV channel). The file download delivery method enables the file casting of multimedia files for storage and delayed consumption at the receiver. Complementary procedures for describing MBMS user services, for protecting the delivered content, and for enhancing the delivery robustness have also been defined. A MBMS user service is then able to make use of different delivery methods, unicast connections, associated procedures, and MBMS bearer services for providing the desired application to the user.

3GPP Technical Specification (TS) 26.346, Section 11, specifies metadata syntax that is used to describe MBMS user services. The service description may be used to advertise/announce a forthcoming multicast/broadcast event. The service description is primarily used for describing the different delivery methods, the access parameters to the service, and any content protection applied to the service. 3GPP TS 25.346 describes the MBMS Radio Access Network (RAN).

One type of MBMS network is an MBMS over a Single Frequency Network (MBSFN). The MBSFN mode uses a 16-QAM modulation arrangement, e.g., a quadrature amplitude modulation with 16 constellation points. This modulation arrangement provides a much higher bandwidth for MBMS user services than other arrangements. However, MBSFN may not have a large coverage and could be limited to some locations in the MBMS network. The co-existence of regular, e.g., non-MBSFN, MBMS and MBSFN is likely to be needed for at least several years.

In 3GPP Release 7, the media codec requirements were updated in order to enable higher quality services. In particular, the H.264 codec level has been upgraded from 1 b, e.g. QCIF resolution at 128 kbps (kilo-bits-per-second), to 1.2, e.g. CIF resolution at 384 kbps. In order to address the increase in bit rate in the newly specified level, more bandwidth capacity than the capacity provided by regular MBMS bearer services, e.g. 256 kbps, is required. One viable commercial setup involves providing 3GPP Release 6 (Rel-6) terminals with a low quality service that fits their capabilities. Release 7 terminals that support MBSFN can benefit from the increased capacity and receive a higher quality service. Currently a piece of user equipment selects, subject to the availability of MBSFN coverage, the variant of the service that best suits the user's needs.

SUMMARY OF THE INVENTION

Various embodiments provide a system and method for signaling the availability of an MBMS user service in multiple variants. Various embodiments involve the usage of the additional capacity introduced by MBSFN in order to carry a higher quality or more robust variant of the service in MBMS. The broadcast multicast service center (BM-SC) may provide the same MBMS user service in two variants, one for the regular MBMS and the other for MBSFN. The MBSFN variant of the service may be charged differently and would then need to be protected separately. According to various embodiments, the user equipment is informed that the same service is present in different variants. The user equipment may then select one of the available variants for consumption.

Using various embodiments, the partial deployment of MBSFN may be achieved in some areas of the MBMS network, while providing the same user services across the MBSFN and regular MBMS areas. The extra capacity provided by MBSFN may be used for delivering a different variant of the service, e.g., services representing a higher level of quality. The user equipment is provided with information regarding the different variants of a service offered in each area and the relationship between these variants. Based on this information, the user equipment may then decide to switch from one variant to another when moving across different areas. According to one embodiment, the user equipment may switch back to the regular services when leaving an MBSFN coverage area.

These and other advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

In an MBSFN, signals from multiple cells may be combined by user equipment in a manner similar to how multipath signal components are combined from a single cell. The user equipment reception of MBMS services provided in MBSFN mode does not affect the behavior of the user equipment on the unicast carrier. In particular, the user equipment's mobility on the unicast carrier is not affected by the reception of MBMS services provided on a cell operating in MBSFN mode and can imply that the reception of the MBMS service on the cell operating in MBSFN mode is impossible due to the limited support of combination of frequency bands for MBMS single frequency network reception and unicast reception.

MBSFN requires all receiving nodes involved in a simulcast transmission using both regular MBMS and MBSFN to be closely time synchronized and the same content to be delivered to each of the involved receiving nodes. All such involved nodes are assumed to share the same controlling radio network controller (CRNC). It should be noted that the MBSFN area is limited to the area controlled by a single radio network controller (RNC).

For time division duplexing (TDD), some or all timeslots may utilize a MBSFN mode of transmission. Such timeslots are configured by the RNC to use the same scrambling codes across participating receiving nodes. Any non-MBSFN timeslots continue to use the scrambling codes associated with the cell ID. The timeslots that are operating in the MBSFN mode form together with the synchronized neighboring cells transmitting the exact same data over the MBSFN cluster. For frequency division duplexing (FDD), receiving nodes participating in a MBSFN transmission operate on all slots of the radio frame. Thus, MBSFN transmission occupies an entire carrier in the case of FDD. For TDD, part or all of the carrier may be used for MBSFN. It is possible for user equipment supporting MBSFN to receive MBMS via carriers operating in FDD or TDD MBSFN modes and to also obtain unicast and MBMS services, e.g., services that are not provided via MBSFN by another carrier.

In conjunction with MBSFN, higher order modulation techniques, e.g., 16-QAM, may be used for secondary common control physical channels (S-CCPCH) and, in the case of 3.84/7.68 Megacycles per second (Mcps) TDD, of a new burst type may be used to support a longer delay spread. The reception of MBMS services over a network operating in MBSFN mode usually requires the user equipment to be registered to a public land mobile network (PLMN) in order to perform higher layer procedures such as subscription to MBMS broadcast services. The user equipment may obtain service details via a point-to-point connection via the carrier that is used to provide unicast services. The user equipment selects a MBSFN cluster to receive the MBMS service that is part of one of the registered PLMN or part of the equivalent PLMN list. It should be noted that network sharing is supported on carriers operating in MBSFN mode using the ability to broadcast multiple PLMNs in the master information block (MIB), just as it supported on carriers supporting unicast services.

For the MBSFN cluster in 1.28 Mcps TDD mode, there may be neither a physical synchronization channel nor a pilot channel configured, and there may be no MBSFN cluster selection/reselection process. The user equipment that needs to receive MBMS services that are delivered in an MBSFN cluster may first get synchronized to the non-MBSFN cell that the MBSFN cluster is associated with. The user equipment may then search the MBSFN cluster with the information indicated in the system information of the non-MBSFN cell. From the user equipment's perspective, the registered PLMN of the MBSFN cluster may be the same as the PLMN that is registered by the user equipment from the associated unicast carrier.

A MBSFN cluster may provide only MBMS service in point-to-multipoint (PtM) mode. Counting and point-to-point (PtP) establishment procedures may not be supported for a cell operating in MBSFN mode.

For FDD and 3.84/7.68 Mcps TDD, selection between MBSFN clusters is performed similar to the way that cell selection is performed for cells that are not operating in MBSFN mode. The user equipment may consider a minimum receive power of the common pilot channel (CPICH) (FDD) or the primary common control physical channel (P-CCPCH) (3.84/7.68 Mcps TDD) in order to determine when to receive MBMS service broadcast in MBSFN mode. However, apart from background search procedures for receiving other MBSFN clusters, the user equipment may not be required to perform inter-frequency measurements for other MBSFN clusters.

In a MBSFN cluster, only MIB, system information blocks 3, 5/5bis and 11 may be broadcast. The content of other system information blocks may be ignored by the user equipment. A MBSFN cluster on one frequency may indicate the existence and the services provided by other MBSFN clusters on different frequencies. The MBSFN cluster on one frequency may also indicate other MBSFN frequencies that have to be selected in order for the user equipment to be aware of available services that are not provided via the currently selected MBSFN cluster and for which the availability may not be indicated on the current MBSFN cluster. The choice of the MBSFN frequency based on this information is user equipment implementation-specific. Because inter frequency measurements for MBSFN frequencies are not applicable, the choice of the MBSFN frequency done by the user equipment may be completely service dependant. For FDD and 3.84/7.68 Mcps TDD, the user equipment may only have to discover one MBSFN cluster on another frequency that fulfills the selection criteria. Other frequencies upon which MBMS service is broadcast in MBSFN mode is indicated on the MBSFN frequency.

A cluster operating in MBSFN mode does not provide paging information, because the MBSFN cluster will not be considered as a suitable cell by the user equipment. The cells in a MBSFN cluster belong to different MBMS service areas compared to the cells of a carrier providing unicast service. This allows the RNC to know which services are intended for the transmission on the cells of a MBSFN cluster. The same MBMS bearer service may not be provided on a MBSFN cluster and the unicast cells. The minimum MBMS service area must be equal to one MBSFN cluster. A MBMS bearer service is transmitted in a complete MBSFN cluster.

The following is a description of exemplary embodiments for a TDD user equipment operating on a carrier in MBSFN mode. In various embodiments, a TDD user equipment operating on a carrier not dedicated to MBSFN follows MBMS procedures specified with respect to the radio resource control states. The reception of MBMS on a cell operating in MBSFN mode is independent of the user equipment behavior for the reception of service on the frequency that the user equipment is camping on for obtaining unicast or MBMS service. For the reception of MBMS services on a TDD cell dedicated to MBSFN operation, the user equipment is conceptually an independent component which receives MBMS service on a TDD cell dedicated to MBSFN.

The TDD component, of a user equipment for receiving MBMS service on a TDD carrier dedicated to downlink MBSFN, may perform various tasks. For example, the TDD component may receive services provided via MBSFN independently of RRC state transitions for any non-MBSFN component of the user equipment. The TDD component also may obtain details concerning the multicast control channel (MCCH) provided via the broadcast control channel (BCCH) of the cell providing MBSFN and may listen to that MCCH for details of MBMS services provided p-t-m on the TDD downlink (DL)-only carrier. Additionally, the TDD component may search for a suitable TDD MBSFN cluster providing the MBMS services that it might be interested in. The respective TDD MBSFN is only required to support broadcast channel (BCH) and forward access channel (FACH) transport channels and physical channels P-CCPCH, SCCPCH, and SCH on the TDD carrier. The TDD MBSFN may optionally support MBMS Notification Indicator Channel (MICH) on the TDD carrier, and it is also expected to receive S-CCPCH configuration information via System Information Block 5 (the user equipment expects to receive System Information blocks 3, 5 and 11 only, in addition to the Master Information Block) via the BCH on the TDD carrier.

The following is a description of exemplary embodiments for a FDD user equipment operating on a carrier in MBSFN mode. In various embodiments, a FDD user equipment operating on a carrier not dedicated to MBSFN follows MBMS procedures specified with respect to the radio resource control states. The reception of MBMS on a cell operating in MBSFN mode is independent to the user equipment behavior for the reception of service on the frequency that the user equipment is camping on for obtaining unicast or MBMS service. For the reception of MBMS services on a FDD cell dedicated to MBSFN operation, the user equipment is conceptually an independent component which receives MBMS service on a FDD cell dedicated to MBSFN.

The FDD component of a user equipment operating in a receive-only mode on a FDD carrier operating in MBSFN mode may perform various tasks. For example, the FDD component may receive services provided via MBSFN independently of RRC state transitions for any non-MBSFN component of the user equipment. The FDD component may also obtain details concerning the MCCH provided via the BCCH of the cell providing MBSFN and listen to that MCCH for details of MBMS services provided p-t-m on the FDD downlink (DL)-only carrier. Additionally, the FDD component may search for a suitable FDD MBSFN cluster. The respective FDD MBSFN is only required to support BCH and FACH transport channels and physical channels P-CCPCH, SCCPCH, MICH and SCH on the FDD carrier. The FDD MBSFN may optionally support MICH on the FDD carrier, and it is also expected to receive S-CCPCH configuration information via System Information Block 5 (the user equipment expects to receive System Information blocks 3, 5 and 11 only, in addition to the Master Information Block) via the BCH on the FDD carrier.

Various embodiments provide a system and method for signaling the availability of an MBMS user service in multiple variants. Various embodiments involve the usage of the additional capacity introduced by MBSFN in order to carry a higher quality or more robust variant of the service in MBMS. The broadcast multicast service center (BM-SC) provides the same MBMS user service in two variants, one for the regular MBMS and the other for MBSFN. The MBSFN variant of the service may be charged differently and would then need to be protected separately. According to various embodiments, the user equipment is informed that the same service is present in different variants and therefore can then select one of the available variants for consumption.

Using various embodiments, the partial deployment of MBSFN can be achieved in some areas of the MBMS network, while providing the same user services across the MBSFN and regular MBMS areas. The extra capacity provided by MBSFN may be used for delivering a different variant of the service, e.g., services representing a higher level of quality. The user equipment is made aware of the relationship between the different variants of the service so that it can switch back to the regular service when leaving an MBSFN coverage area.

In the event that parallel reception of MBSFN and regular MBMS simultaneously is possible, then the MBSFN broadcast may carry data that is complementary to the regular MBMS broadcast. For example, enhancement video layers in accordance with scalable video coding (SVC) can be broadcast by a MBSFN cluster, while a base video layer is broadcast using regular MBMS cells. Another example involves sharing one media component (e.g., the audio stream) with the regular MBMS broadcast, while providing a high-quality variant of the video stream over MBSFN.

The relationship between the different transmissions (MBMS multicast/broadcast and MBSFN broadcast) is indicated to the user/user equipment. In various embodiments, the relationship may be either alternative or complementary.

The implementation of various embodiments involves the use of signaling in the MBMS service description. The different variants of the service and their respective relationships are described to the user/user equipment. In one particular implementation, the "userServiceDescription" XML fragment is extended in order to signal that the user service descriptions are variants of the same MBMS user service. The following is an example of a modified "userServiceDescription" fragment:

```
<?xml version="1.0" encoding="UTF-8"?>
<xs:schema xmlns="urn:3GPP:metadata:2005:MBMS:userServiceDescription"
xmlns:xs="http://www.w3.org/2001/XMLSchema"
targetNamespace="urn:3GPP:metadata:2005:MBMS:userServiceDescription"
elementFormDefault="qualified">
    <xs:element name="bundleDescription" type="bundleDescriptionType"/>
    <xs:complexType name="bundleDescriptionType">
        <xs:sequence>
            <xs:element name="userServiceDescription" type="userServiceDescriptionType" maxOccurs="unbounded"/>
            <xs:any namespace="##other" minOccurs="0" maxOccurs="unbounded" processContents="lax"/>
```

```
        </xs:sequence>
        <xs:attribute name="fecDescriptionURI" type="xs:anyURI" use="optional"/>
        <xs:anyAttribute processContents="skip"/>
    </xs:complexType>
    <xs:complexType name="userServiceDescriptionType">
        <xs:sequence>
            <xs:element name="name" type="nameType" minOccurs="0" maxOccurs="unbounded"/>
            <xs:element name="serviceLanguage" type="xs:language" minOccurs="0" maxOccurs="unbounded"/>
            <xs:element name="requiredCapabilities" type="requirementsType" minOccurs="0" maxOccurs="1"/>
            <xs:element name="serviceGroup" type="serviceGrouptype" maxOccurs="unbounded"/>
            <xs:element name="deliveryMethod" type="deliveryMethodType" maxOccurs="unbounded"/>
            <xs:element name="accessGroup" type="accessGroupType" minOccurs="0" maxOccurs="unbounded"/>
            <xs:any namespace="##other" minOccurs="0" maxOccurs="unbounded" processContents="lax"/>
        </xs:sequence>
        <xs:attribute name="serviceId" type="xs:anyURI" use="required"/>
        <xs:anyAttribute processContents="skip"/>
    </xs:complexType>
    <xs:complexTypename="accessGroupType">
        <xs:sequence>
            <xs:element name="accessBearer" type="xs:string" maxOccurs="unbounded"/>
        </xs:sequence>
        <xs:attribute name="id" type="accessGroupIdType" use="required"/>
    </xs:complexType>
    <xs:complexType name="deliveryMethodType">
        <xs:sequence>
            <xs:any namespace="##other" minOccurs="0" maxOccurs="unbounded" processContents="lax"/>
        </xs:sequence>
        <xs:attribute name="accessGroupId" type="accessGroupIdType" use="optional"/>
        <xs:attribute name="associatedProcedureDescriptionURI" type="xs:anyURI" use="optional"/>
        <xs:attribute name="protectionDescriptionURI" type="xs:anyURI" use="optional"/>
        <xs:attribute name="sessionDescriptionURI" type="xs:anyURI" use="required"/>
        <xs:attribute name="accessPointName" type="xs:anyURI" use="optional"/>
        <xs:anyAttribute processContents="skip"/>
    </xs:complexType>
    <xs:complexType name="nameType">
        <xs:simpleContent>
            <xs:extension base="xs:string">
                <xs:attribute name="lang" type="xs:language" use="optional"/>
            </xs:extension>
        </xs:simpleContent>
    </xs:complexType>
    <xs:simpleType name="accessGroupIdType">
        <xs:restriction base="xs:nonNegativeInteger">
        </xs:restriction>
    </xs:simpleType>
    <xs:complexType name="requirementsType">
        <xs:sequence>
            <xs:element name="feature" type="xs:unsignedInt" minOccurs="1" maxOccurs="unbounded"/>
        </xs:sequence>
    </xs:complexType>
    <xs:complexType name="serviceGroupType">
        <xs:sequence>
            <xs:element name="serviceRef" type="xs:anyURI" minOccurs="0" maxOccurs="unbounded">
        </xs:sequence>
            <xs:attribute name="groupID" type="xs:anyURI" use="required"/>
            <xs:attribute name="relationship" type="serviceRelationType" use="required"/>
    </xs:complexType>
    <xs:simpleType name="serviceRelationType">
        <xs:restrictionbase="xs:string">
            <xs:enumeration value="alternative">
            <xs:enumeration value="Base">
            <xs:enumeration value="Enhancement">
        </xs:restriction>
    </xs:simpleType>
</xs:schema>
```

The following is an example instantiation of the two user service descriptions, including alternative variants of the same user service. The second of the two service descriptions includes a capability requirement to check for support of MBSFN.

```
<userServiceDescription serviceId="http://www.example.com/service1/alternative1">
        <name lang="en">Service 1, QCIF</name>
        <serviceLanguage>en</serviceLanguage>
        <requiredCapabilities>
            <feature>2</feature>
            <feature>6</feature>
        </requiredCapabilities>
        <deliveryMethod
sessionDescriptionURI="http://www.example.com/service1/alternative1/session.sdp"/>
        <serviceGroup groupID="group1" relationship="alternative"/>
    </userServiceDescription>
</bundleDescription>
-------------------------------------------------------------------------------
<bundleDescription fecDescriptionURI="http://www.example.com/service1/alternative2/fec.sdp">
    <userServiceDescription serviceId="http://www.example.com/service1/alternative2">
        <name lang="en">Service 1, CIF</name>
        <serviceLanguage>en</serviceLanguage>
        <requiredCapabilities>
            <feature>2</feature>
            <feature>13</feature>
            <feature>14</feature>
        </requiredCapabilities>
        <deliveryMethod
sessionDescriptionURI="http://www.example.com/service1/alternative2/session.sdp"/>
        <serviceGroup groupID="group1" relationship="alternative"/>
    </userServiceDescription>
</bundleDescription>
```

Figure 3:
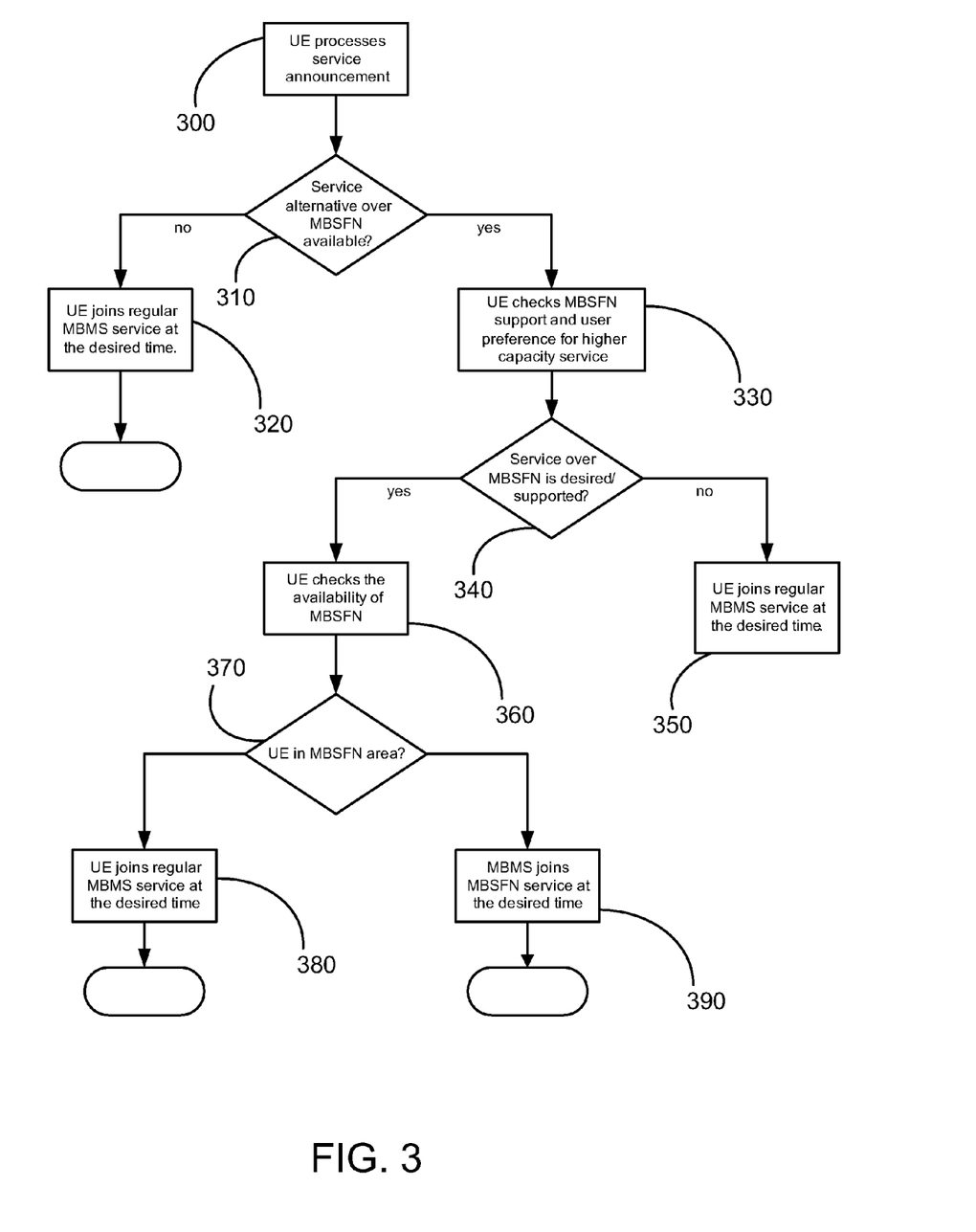
FIG. 3 is a flow chart showing an exemplary process by which a piece of user equipment can join either a regular MBMS service or an MBSFN service.

FIG. 3 is a flow chart showing an exemplary embodiment of the process by which a piece of user equipment may select the appropriate service based upon MBSFN support and availability. At 300 in FIG. 3, the user equipment processes a received service announcement. At 310, it determines whether a service alternative is available using MBSFN, i.e., whether the service is being provided at all using MBSFN. If not, then at 320 the user equipment simply joins the regular MBMS service at the desired time. However, if the service is available using a MBSFN, at 330 the user equipment checks for whether it can support MBSFN and whether there is a preference by the user equipment for a higher capacity service. If service over MBSFN is not desired or supported by the user equipment, then at 340 the user equipment joins the regular MBMS service at the desired time. If service over MBSFN is supported and desired, however, at 350 the user equipment checks for the availability of the MBSFN at 360, with a determination made at 370 whether the user equipment is in an MBSFN area. For example, the network can transmit to the user equipment via a paging channel information regarding whether the current area is an MBSFN coverage area, and this information can be used to make the determination. If the user equipment is not in an MBSFN area, then at 380 the user equipment joins the regular MBMS service at the desired time. If the user equipment is in an MBSFN area, on the other hand, then at 390 the user equipment joins the MBSFN service at the desired time. As discussed previously, it is also possible for the user equipment to receive the service over both the regular MBMS and MBSFN at 390 in certain situations, such as where enhancement information is being provided over MBSFN and base information is being provided over regular MBMS. It should be noted that the various processes depicted in FIG. 3 may be performed in an order different order than that depicted therein. For example, the user equipment may check whether it supports MBSFN before it checks whether the service is offered in MBSFN mode.

Figure 1:
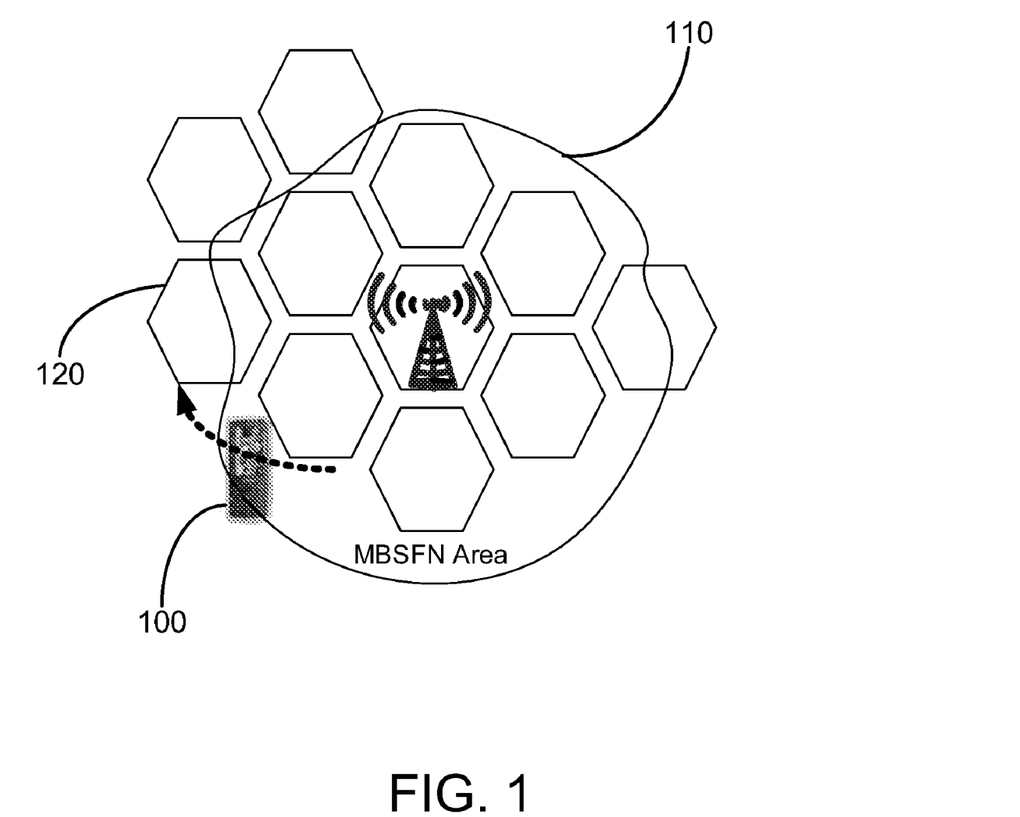
FIG. 1 is a representation of an example situation where a user equipment item moves out of an MBSFN area and into a regular MBMS cell.
Figure 2:
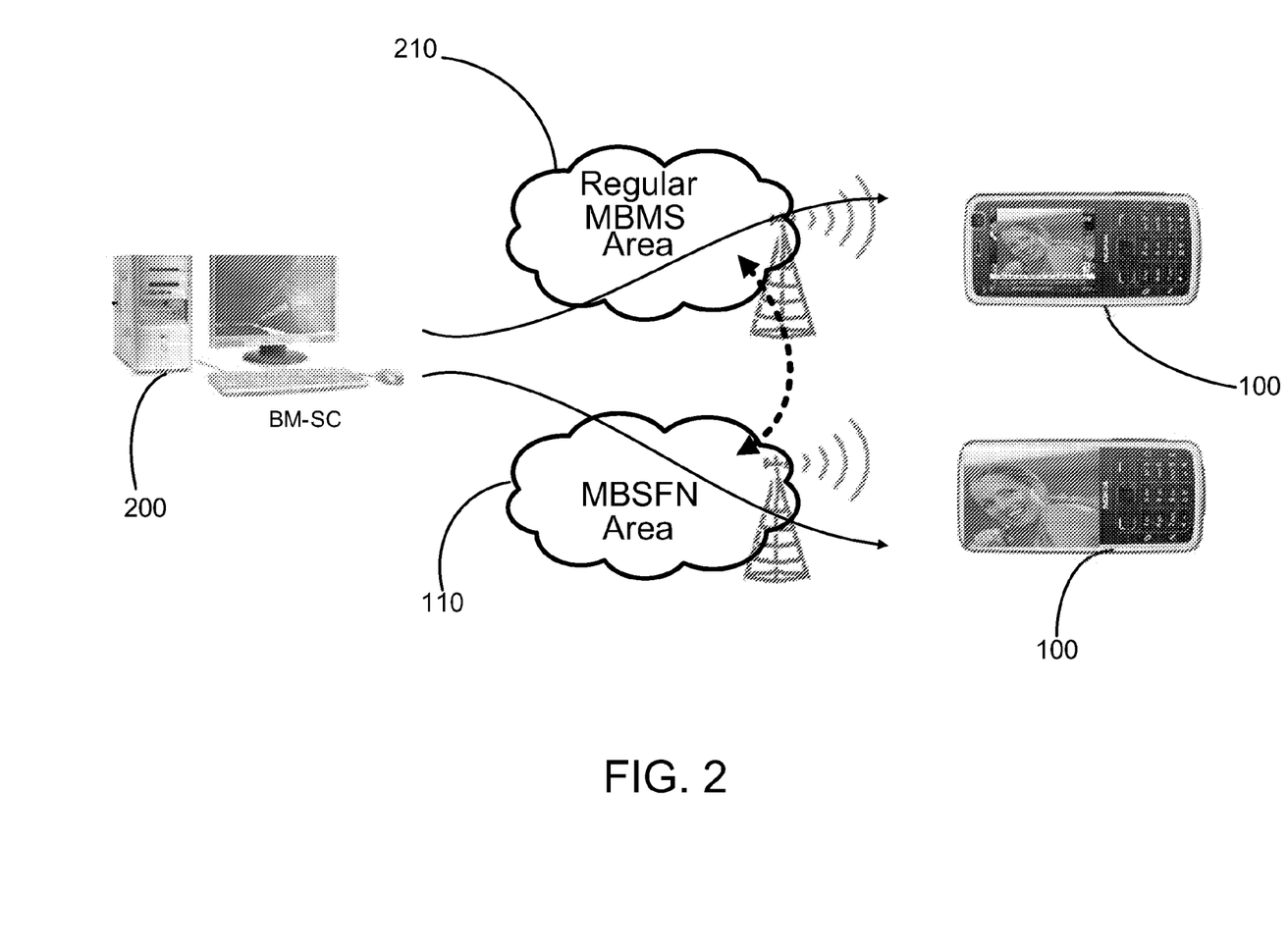
FIG. 2 is a graphical representation showing a handover procedure between a regular MBMS network and MBSFN while a particular user service is being consumed by user equipment.

Another embodiment involves the situation where a user equipment moves out of an MBSFN area and into an area that is only supported by regular MBMS service. This is depicted generally in FIG. 1, where the user equipment 100 exits the MBSFN coverage area 110 and then enters a regular MBMS cell 120, i.e., a cell without any MBSFN coverage. In response to this movement, a handover has to occur between MBSFN and regular MBMS in order to maintain reception of the service at issue. An exemplary embodiment of the handover is depicted in FIG. 2. In FIG. 2, a BM-SC 200 broadcasts or multicasts both regular MBMS, for consumption in the regular MBMS coverage area 210, and MBSFN, for consumption in the MBSFN coverage area 110. When the user equipment 100 switches from MBSFN coverage area 110 to the regular MBMS coverage area 210 (or vice versa), the handover procedure permits the user equipment 100 to continue to receive the same user service, albeit possibly at a different quality level.

Figure 4:
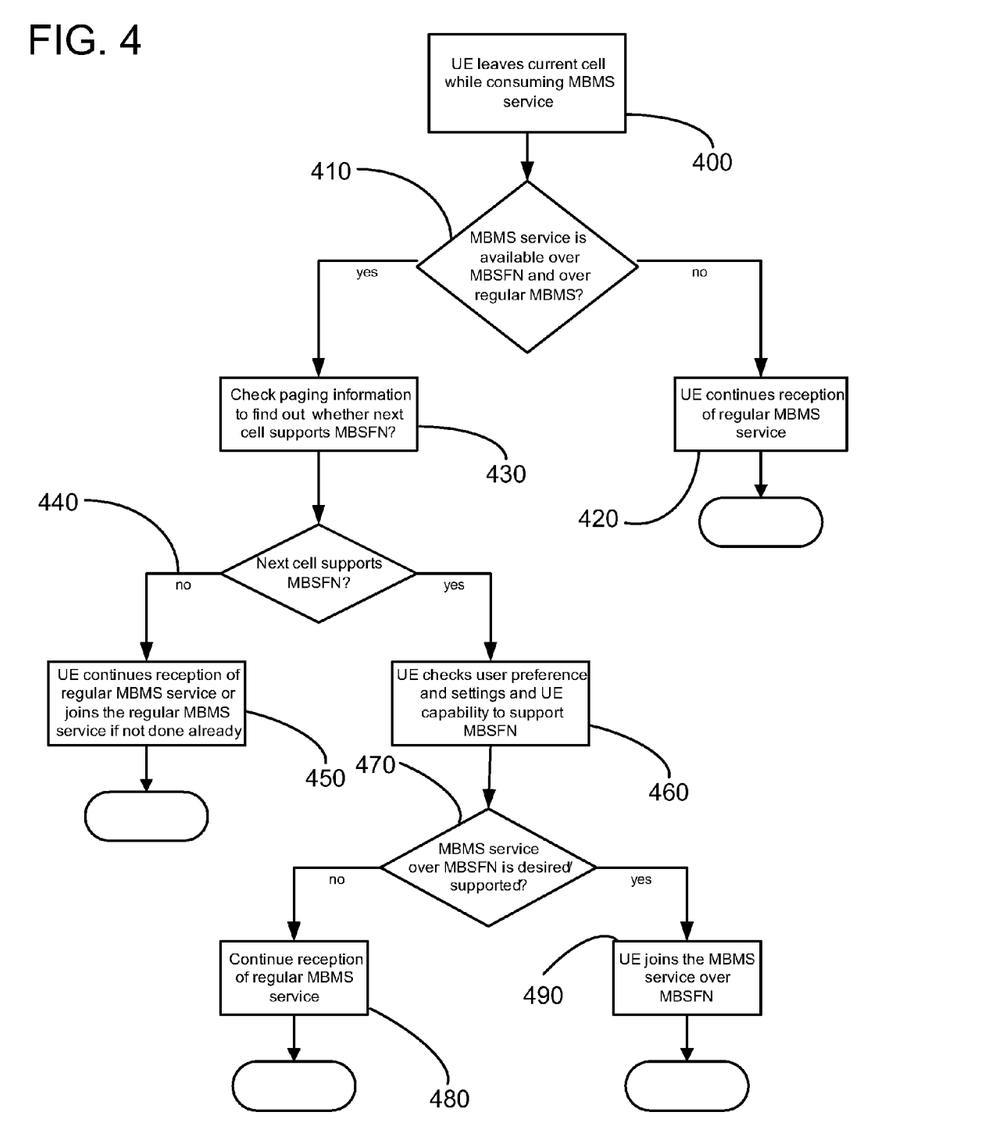
FIG. 4 is a flow chart showing an exemplary process by which a piece of user equipment can join either a regular MBMS service or an MBSFN service in response to the user equipment leaving a current cell while consuming an MBMS service.

FIG. 4 is a flow chart showing an exemplary process which may occur when a user equipment leaves a current cell while consuming an MBMS service (represented at 400). At 410, it is determined whether a particular MBMS service is available over both modes, e.g. MBSFN and the regular MBMS. If the service is being provided only over regular MBMS, then the user equipment continues reception of the regular MBMS service at 420. If the service is being provided over both regular MBMS and MBSFN, however, then at 430 paging information is checked and, at 440, it is determined whether the next cell supports MBSFN. If the next cell, e.g. the cell to which the user equipment moved, does not support MBSFN, then at 450 the user equipment continues the reception of the regular MBMS service or joins the regular MBMS service, if not done already. If the next cell does support MBSFN, then the user equipment checks user preferences, settings, and the user equipment's MBSFN capability at 460 and determines, at 470, whether an MBMS service over MBSFN is desired and supported by the user equipment. If service over MBSFN is not desired or is not supported by the user equipment, then at 480 the user equipment joins the regular MBMS service at the desired time. If service over MBSFN is supported and desired, however, then at 490 the user equipment joins the MBMS service over MBSFN. As discussed previously, it is also possible for the user equipment to receive the service over both the regular MBMS and MBSFN at 490 in certain situations, such as where enhancement information is being provided over MBSFN and base information is being provided over regular MBMS. It should be noted that the various processes depicted in FIG. 4 may be performed in an order different order than that depicted therein.

Figure 5:
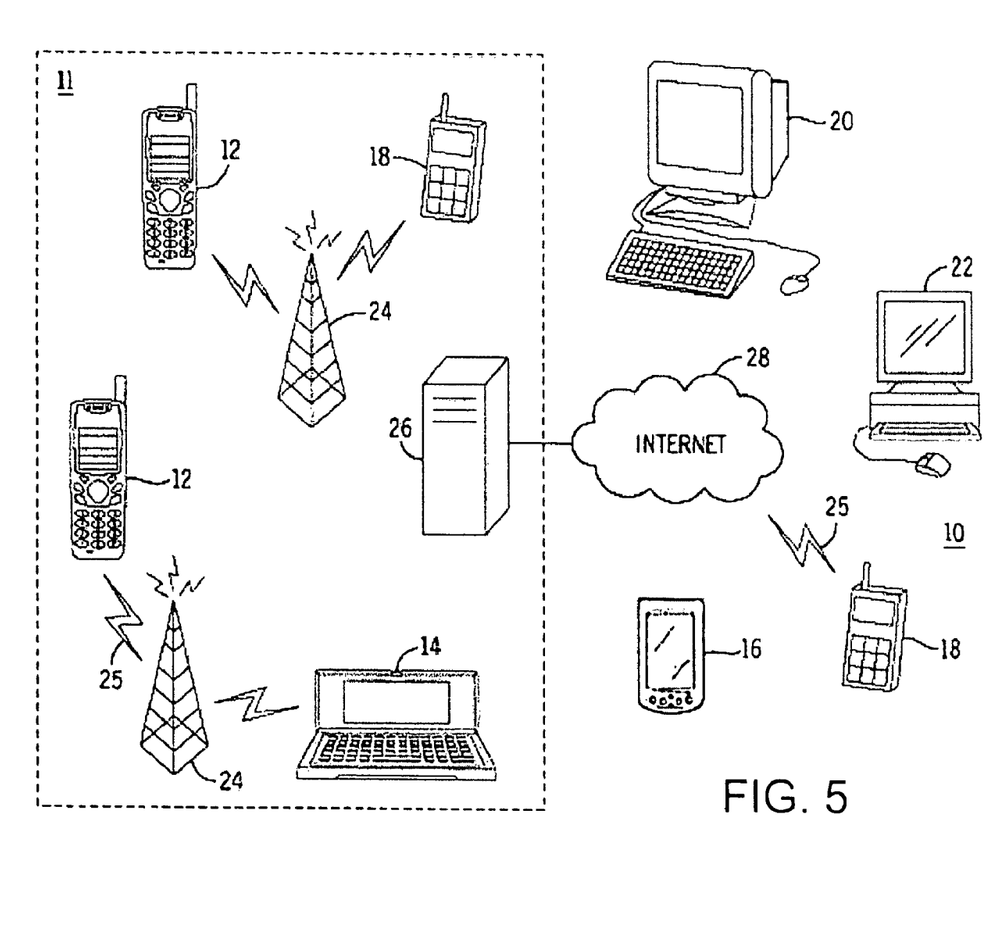
FIG. 5 is an overview diagram of a system within which various embodiments may be implemented.

FIG. 5 shows a system 10 in which various embodiments can be utilized, comprising multiple communication devices that can communicate through one or more networks. The system 10 may comprise any combination of wired or wireless networks including, but not limited to, a mobile telephone network, a wireless Local Area Network (LAN), a Bluetooth personal area network, an Ethernet LAN, a token ring LAN, a wide area network, the Internet, etc. The system 10 may include both wired and wireless communication devices.

For exemplification, the system 10 shown in FIG. 5 includes a mobile communications network 11 and the Internet 28. The communications network 11 may be a mobile telephone network, a digital broadcast broadband network or any other similar communications network and combinations thereof. The communication between entities of the communications network 11 may be unidirectional or bidirectional. Connectivity to the Internet 28 may include, but is not limited to, long range wireless connections, short range wireless connections, and various wired connections including, but not limited to, telephone lines, cable lines, power lines, and the like.

The exemplary communication devices of the system 10 may include, but are not limited to, a mobile electronic device 50 in the form of a mobile telephone, a combination personal digital assistant (PDA) and mobile telephone 14, a PDA 16, an integrated messaging device (IMD) 18, a desktop computer 20, a notebook computer 22, etc. The communication devices may be stationary or mobile as when carried by an individual who is moving. The communication devices may also be located in a mode of transportation including, but not limited to, an automobile, a truck, a taxi, a bus, a train, a boat, an airplane, a bicycle, a motorcycle, etc. Some or all of the communication devices may send and receive calls and messages and communicate with service providers through a wireless connection 25 to a base station 24. The base station 24 may be connected to a network server 26 that allows communication between the communications 11 and the Internet 28. The system 10 may include additional communication devices and communication devices of different types.

Communication devices of the various embodiments discussed herein may communicate using various transmission technologies including, but not limited to, Code Division Multiple Access (CDMA), Global System for Mobile Communications (GSM), Universal Mobile Telecommunications System (UMTS), Time Division Multiple Access (TDMA), Frequency Division Multiple Access (FDMA), Transmission Control Protocol/Internet Protocol (TCP/IP), Short Messaging Service (SMS), Multimedia Messaging Service (MMS), e-mail, Instant Messaging Service (IMS), Bluetooth, IEEE 802.11, etc. A communication device may communicate using various media including, but not limited to, radio, infrared, laser, cable connection, and the like.

Figure 6:
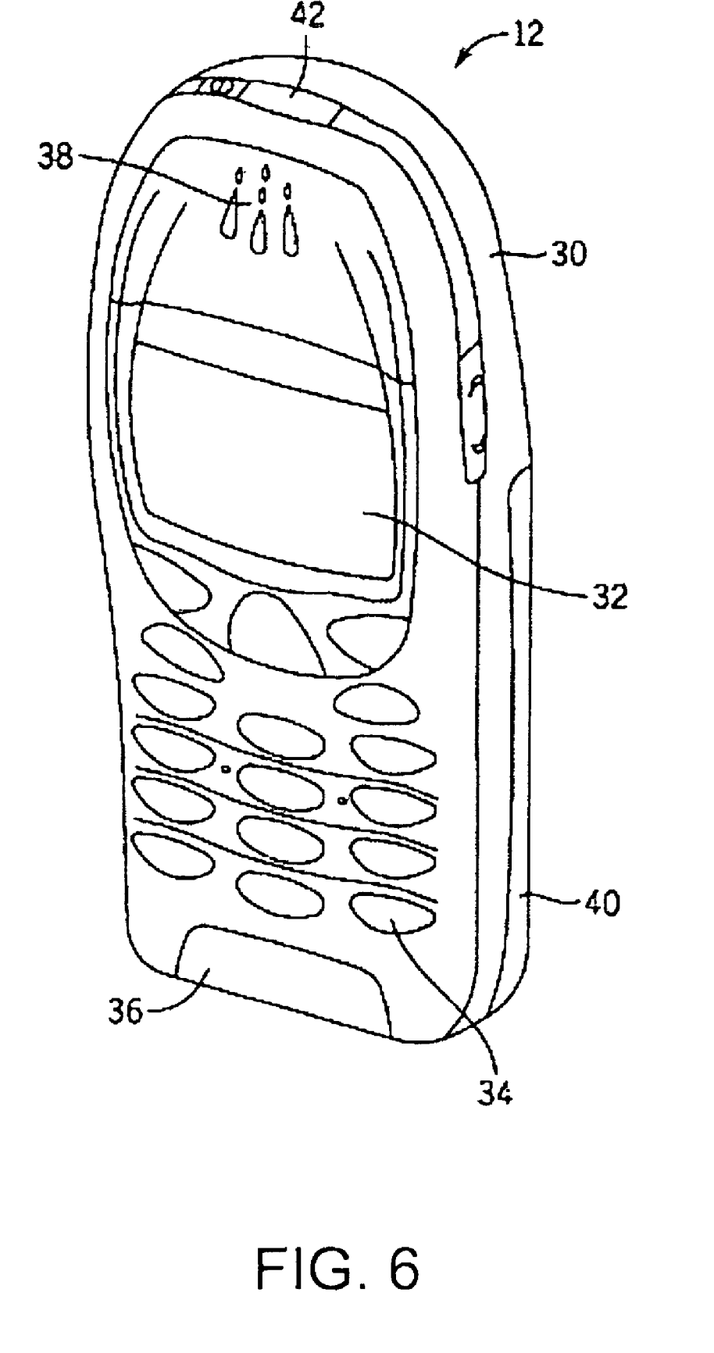
FIG. 6 is a perspective view of an electronic device that can be used in conjunction with the implementation of various embodiments of the present invention.
Figure 7:
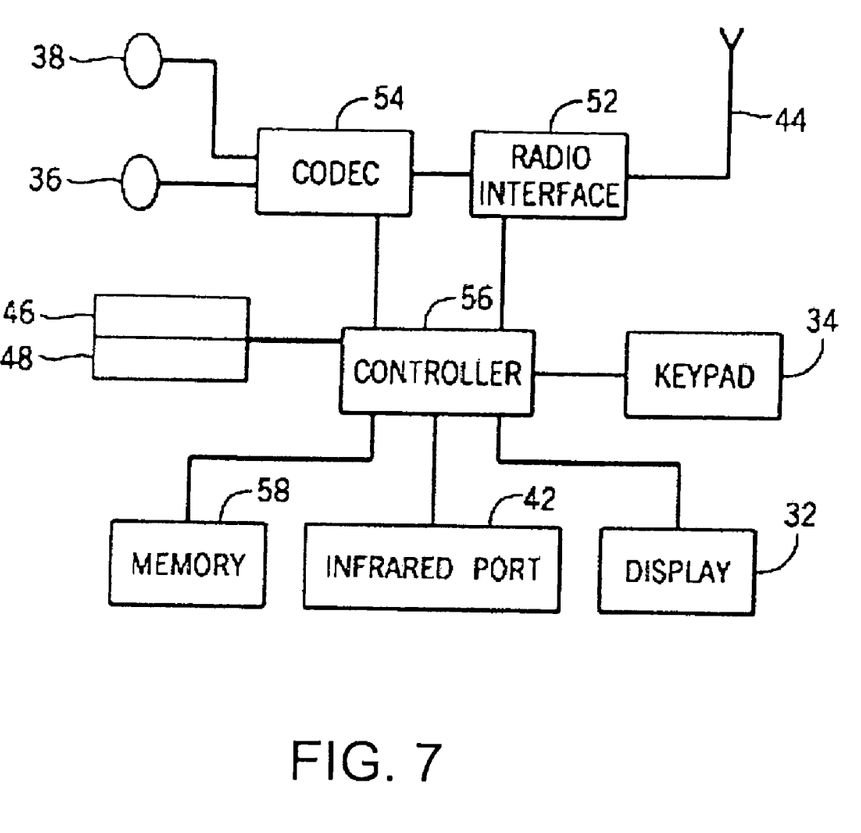
FIG. 7 is a schematic representation of the circuitry which may be included in the electronic device of FIG. 6.

FIGS. 6 and 7 show one representative mobile device 12 within which various embodiments may be implemented. Any and all of the devices described herein may include any and/or all of the features described in FIGS. 6 and 7. It should be understood, however, that the present invention is not intended to be limited to one particular type of electronic device. The mobile device 12 of FIGS. 6 and 7 includes a housing 30, a display 32 in the form of a liquid crystal display, a keypad 34, a microphone 36, an ear-piece 38, a battery 40, an infrared port 42, an antenna 44, a smart card 46 in the form of a UICC according to one embodiment, a card reader 48, radio interface circuitry 52, codec circuitry 54, a controller 56 and a memory 58. Individual circuits and elements are all of a type well known in the art.

The various embodiments described herein are described in the general context of method steps or processes, which may be implemented in one embodiment by a computer program product, embodied in a computer-readable medium, including computer-executable instructions, such as program code, executed by computers in networked environments. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

Embodiments of the present invention may be implemented in software, hardware, application logic or a combination of software, hardware and application logic. The software, application logic and/or hardware may reside on a chipset, a mobile device, a desktop, a laptop or a server. The application logic, software or an instruction set is preferably maintained on any one of various conventional computer-readable media. In the context of this document, a "computer-readable medium" can be any media or means that can contain, store, communicate, propagate or transport the instructions for use by or in connection with an instruction execution system, apparatus, or device.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   determining whether a service is being provided at least over a Multimedia Broadcast/Multicast Service Over a Single Frequency Network (MBSFN);
   in an instance in which the service is being provided over a MBSFN, performing at least one of:
      determining whether a user equipment supports MBSFN and desires to receive the service using the MBSFN; and
      determining whether the user equipment is an area which can receive the MBSFN;
   processing the service using a regular Multimedia Broadcast/Multicast Service (MBMS) in an instance in which: the user equipment does not support MBSFN, the user equipment does not desire to receive the service using the MBSFN, or the user equipment is not in an area which can receive the MBSFN; and
   processing the service using the MBSFN in an instance in which: the user equipment supports MBSFN, the user equipment desires to receive the service using the MBSFN, and the user equipment is in an area which can receive the MBSFN.

2. The method of claim 1, wherein determining whether the service is being provided at least over the MBSFN is performed in response to the user equipment moving between cells while consuming an MBMS service.

3. The method of claim 1, wherein determining whether the service is being provided over the MBSFN is performed in response to the user equipment receiving a service announcement.

4. The method of claim 1, further comprising, in an instance in which the service is not being provided over a MBSFN, receiving the service using the regular MBMS.

5. The method of claim 1, further comprising receiving the service using both the MBSFN and the regular MBMS in an instance in which: the user equipment supports MBSFN, the user equipment desires to receive the service using the MBSFN, and the user equipment is in an area which can receive the MBSFN.

6. The method of claim 1, further comprising receiving the service using only the MBSFN in an instance in which: the user equipment supports MBSFN, the user equipment desires to receive the service using the MBSFN, and the user equipment is in an area which can receive the MBSFN.

7. The method of claim 1, wherein determining whether a service is being provided at least over a MBSFN is based on signaling received from a remote device.

8. A computer program product, embodied in a non-transitory computer-readable medium, comprising computer code configured to, upon execution, cause an apparatus to perform the method according to claim 1.

9. An apparatus comprising a processor and a memory storing computer code therein, the memory and computer code being configured to, with the processor, cause the apparatus to at least:
   determine whether a service is being provided at least over a Multimedia Broadcast/Multicast Service Over a Single Frequency Network (MBSFN);
   in an instance in which the service is being provided over a MBSFN, perform at least one of:
      determine whether a user equipment supports MBSFN and desires to receive the service using the MBSFN; and
      determine whether the user equipment is an area which can receive the MBSFN;
   process the service using a regular Multimedia Broadcast/Multicast Service (MBMS) in an instance in which: the user equipment does not support MBSFN, the user equipment does not desire to receive the service using the MBSFN, or the user equipment is not in an area which can receive the MBSFN; and
   process the service using the MBSFN in an instance in which: the user equipment supports MBSFN, the user equipment desires to receive the service using the MBSFN, and the user equipment is in an area which can receive the MBSFN.

10. The apparatus of claim 9, wherein the apparatus is caused to determine whether the service is being provided at least over the MBSFN in response to the user equipment moving between cells while consuming an MBMS service.

11. The apparatus of claim 9, wherein the apparatus is caused to determine whether the service is being provided over the MBSFN in response to the user equipment receiving a service announcement.

12. The apparatus of claim 9, wherein the apparatus is further caused to, in an instance in which the service is not being provided over a MBSFN, receive the service using the regular MBMS.

13. The apparatus of claim 9, wherein the apparatus is further caused to receive the service using both the MBSFN and the regular MBMS in an instance in which: the user equipment supports MBSFN, the user equipment desires to receive the service using the MBSFN, and the user equipment is in an area which can receive the MBSFN.

14. The apparatus of claim 9, wherein the apparatus is further caused to receive the service using only the MBSFN in an instance in which: the user equipment supports MBSFN, the user equipment desires to receive the service using the MBSFN, and the user equipment is in an area which can receive the MBSFN.

15. The apparatus of claim 9, wherein the apparatus is caused to determine whether a service is being provided at least over a MBSFN based on signaling received from a remote device.

16. An apparatus, comprising:
   means for determining whether a service is being provided at least over a Multimedia Broadcast/Multicast Service Over a Single Frequency Network (MBSFN);
   means for, in an instance in which the service is being provided over a MBSFN, performing at least one of:
      determining whether a user equipment supports MBSFN and desires to receive the service using the MBSFN; and
      determining whether the user equipment is an area which can receive the MBSFN;
   means for processing the service using a regular Multimedia Broadcast/Multicast Service (MBMS) in an instance in which: the user equipment does not support MBSFN, the user equipment does not desire to receive the service using the MBSFN, or the user equipment is not in an area which can receive the MBSFN; and
   means for processing the service using the MBSFN in an instance in which: the user equipment supports MBSFN, the user equipment desires to receive the service using the MBSFN, and the user equipment is in an area which can receive the MBSFN.

17. A method, comprising:
   causing a service to be transmitted to a user equipment over at least one of a regular Multimedia Broadcast/Multicast Service (MBMS) or a Multimedia Broadcast/Multicast Service Over a Single Frequency Network (MBSFN); and causing signaling information regarding whether the service is being provided over the MBSFN to be transmitted to the user equipment, whereby the user equipment is configured to use the transmitted information to determine whether to process the service over at least the MBSFN;

wherein the signaling information includes information regarding, in an instance in which the service is being provided over the MBSFN, whether the service being transmitted over the MBSFN is one of alternative or complementary to the service being transmitted over the regular MBMS.

18. The method of claim 17, wherein, in an instance in which the service as being transmitted over the MBSFN is complementary to the service as being transmitted over the regular MBMS: the service as being transmitted over the MBSFN includes enhancement information, and the service as being transmitted over the regular MBMS includes base information.

19. The method of claim 17, wherein the signaling information is caused to be transmitted in at least one user service description fragment.

20. A computer program product, embodied in a non-transitory computer-readable medium, comprising computer code configured to, upon execution, cause an apparatus to perform the method according to claim 17.

21. An apparatus comprising a processor and a memory storing computer code, the memory and computer code being configured to, with the processor, cause the apparatus to at least:
cause a service to be transmitted to a user equipment over at least one of a regular Multimedia Broadcast/Multicast Service (MBMS) and a Multimedia Broadcast/Multicast Service Over a Single Frequency Network (MBSFN); and
cause signaling to be transmitted to the user equipment, the signaling information regarding whether the service is being provided over the MBSFN, whereby the user equipment is configured to use the transmitted information to determine whether it should process the service over at least the MBSFN;
wherein the signaling information includes information regarding, in an instance in which the service is being provided over the MBSFN, whether the service being transmitted over the MBSFN is one of alternative or complementary to the service being transmitted over the regular MBMS.

22. The apparatus of claim 21, wherein, in an instance in which the service as being transmitted over the MBSFN is complementary to the service as being transmitted over the regular MBMS: the service as being transmitted over the MBSFN includes enhancement information, and the service as being transmitted over the regular MBMS includes base information.

23. The apparatus of claim 21, wherein the signaling information is caused to be transmitted in at least one user service description fragment.

24. An apparatus, comprising:
means for causing a service to be transmitted to a user equipment over at least one of a regular Multimedia Broadcast/Multicast Service (MBMS) and a Multimedia Broadcast/Multicast Service Over a Single Frequency Network (MBSFN); and
means for causing signaling information to be transmitted to the user equipment, the signaling information regarding whether the service is being provided over the MBSFN, whereby the user equipment is configured to use the transmitted information to determine whether it should process the service over at least the MBSFN;
wherein the signaling information includes information regarding, in an instance in which the service is being provided over the MBSFN, whether the service being transmitted over the MBSFN is one of alternative or complementary to the service being transmitted over the regular MBMS.

\* \* \* \* \*